United States Patent

Hale

[11] Patent Number: 5,979,927
[45] Date of Patent: Nov. 9, 1999

[54] APPARATUS FOR ALIGNING HITCHES OF TOWING AND TOWED VEHICLES

[76] Inventor: Dennis R. Hale, 12638 Pannikin Ave., Punta Gorda, Fla. 33950-2318

[21] Appl. No.: 08/971,640

[22] Filed: Nov. 17, 1997

[51] Int. Cl.⁶ ................................................ G02B 5/08
[52] U.S. Cl. ........................ 280/477; 248/486; 248/277.1; 359/872
[58] Field of Search .................... 248/472, 474, 248/461, 277.1, 486, 205.2; 359/838, 871, 872, 841, 844, 881, 849; 280/504, 477; 356/139.04, 153

[56] References Cited

U.S. PATENT DOCUMENTS

| | | | |
|---|---|---|---|
| 1,391,491 | 9/1921 | O'Donnell | 248/461 |
| 1,594,147 | 7/1926 | Barrows | 359/860 |
| 2,452,375 | 10/1948 | Hirshbergh | 312/226 |
| 2,623,435 | 12/1952 | Geis | 108/3 |
| 3,332,731 | 7/1967 | Penk | 359/872 |
| 5,309,289 | 5/1994 | Johnson | 359/871 |
| 5,657,175 | 8/1997 | Brewington | 359/872 |
| 5,784,213 | 7/1998 | Howard | 359/872 |

*Primary Examiner*—Lanna Mai
*Assistant Examiner*—Avraham H. Lerner
*Attorney, Agent, or Firm*—Frank A. Lukasik

[57] ABSTRACT

An apparatus for aligning hitches of towing vehicles and towed vehicles consisting of a base box detachably fastened to a trailer tongue. A scissors lift consisting of a series of levers is pivotally connected in the base box and a top box is pivotally mounted on the upper portion of the scissors lift. When the top box is lifted, the top box, having a mirror fastened to the underside, is set at a 45° angle to focus the relative positions of the hitch ball and the hitch cup in the rear view mirror of the towing vehicle for alignment.

2 Claims, 12 Drawing Sheets

APPARATUS FOR ALIGNING HITCHES OF TOWING AND TOWED VEHICLES

BACKGROUND OF THE INVENTION

1. Field of the Invention

This invention relates generally to visual aid to help in backing a vehicle trailer ball hitch to the cup on the trailer tongue, and more particularly to an angled mirror which allows an overhead view to the driver of the joining of the ball and hitch.

2. Background of the Invention

The connecting of hitches between a towing vehicle and a towed vehicle, such as a house or boat trailer is a difficult procedure normally requiring the attention of two people, one to operate the towing vehicle and the other to direct the driver of the towing vehicle and the other to direct the driver of the towing vehicle to move the hitch member of the towing vehicle toward the hitch member of the towed vehicle and to stop the towing vehicle when the hitches are aligned for engagement. When an additional person is not available, the problems of the operator of the towing vehicles increases appreciably, and a considerable amount of maneuvering is encountered before the mating portions of the hitching apparatus are properly aligned for engagement.

In the field of alignment devices for hitching a towed vehicle to a towing vehicle, it has been the general practice to employ a rod or post attached to the hitch of the towed vehicle to indicate the location of the engaging portion of the hitch. Although such devices have served the purpose, they have not proved entirely satisfactory under all conditions of service for the reasons that considerable difficulty has been experienced in visibility of the rod or post and difficulties encountered in judging the distance between the post and the hitch of the towing vehicle. Further difficulties have been encountered in judging the angle at which the towing vehicle is approaching the hitch of the towed vehicle.

One such prior art towing hitch alignment device is shown in U.S. Pat. No. 4,905,376 to Neeley which discloses a hitch viewing mirror which mounts directly to the tow vehicle, either a special tail-gate clamp for a pick-up truck or a magnetic mount for a passenger car. U.S. Pat. No. 5,180,182 to Haworth discloses a trailer hitch alignment device having a base member upon which a convex mirror is fixed. Two side members are hingedly attached to opposing edges of the base member so as to fold in sequence across the mirror in the closed position or to expose the mirror in the open position. The side members each have an angled slot, formed in the edge opposing the hinged edge. U.S. Pat. No. 5,309,289 to Johnson discloses an optical target system for facilitating a vehicle operator's effecting alignment of the respective hitch assembly components of a towing vehicle and a towed vehicle.

U.S. Pat. No. 5,478,101 to Roberson discloses an alignment device which detachably mounts to a tailgate of a pick-up truck for visually aligning a hitch ball on a drop hitch bumper of the truck with a coupler on a tow bar of a trailer. U.S. Pat. No. 5,558,352 to Mills discloses a trailer hitch alignment device utilizing two masts having acrylic flags attached thereto mounted upon the hitch components of the respective vehicles to provide visual reference points for the driver.

One of the most critical problems confronting designers of aligning devices for towing and towed vehicle hitches has been the indication of precise alignment of the coupling portions of the hitches of the vehicles which is overcome by the present invention.

It is therefore an object of the invention to provide a guiding apparatus for assisting the operator of a towing vehicle to align the hitch member thereof with the hitch member of a towed vehicle for interconnection.

Another object is to provide guiding apparatus which may be utilized by the operator of a towing vehicle without the need for assistance by another person in aligning the hitch of the towing vehicle with the hitch of a towed vehicle for interconnection.

It is still another object of the invention to provide aligning equipment which is self-contained, portable, and easily and quickly mounted on a towed vehicle for use in in coupling the vehicle for use in coupling the vehicles together, and then easily and quickly removed after such coupling has been accomplished.

Other objects and many of the attendant advantages of this invention will be readily apparent as the same becomes better understood by reference to the following detailed description when considered in connection with the accompanying drawings in which like reference numerals designate like parts throughout the figures thereof.

SUMMARY OF THE INVENTION

The invention pertains to a visual aid in backing a vehicle trailer ball hitch to the cup on the trailer tongue. An angled mirror allows an overhead view to the driver of the joining of the ball and hitch. The entire assembly of the mirror is elevated to a sighting position on a scissors type jack and then collapsed and folded into a mating top and bottom cover. The lower base may then be fastened to the trailer hitch with velcro to make the unit easily removable once the two vehicles are hitched together. The base contains a plurality of notches to provide a method of adjusting the height of the sighting mirror to accommodate the different heights of the towing vehicle and towing ball.

DESCRIPTION OF THE PREFERRED EMBODIMENT

Figure 1:
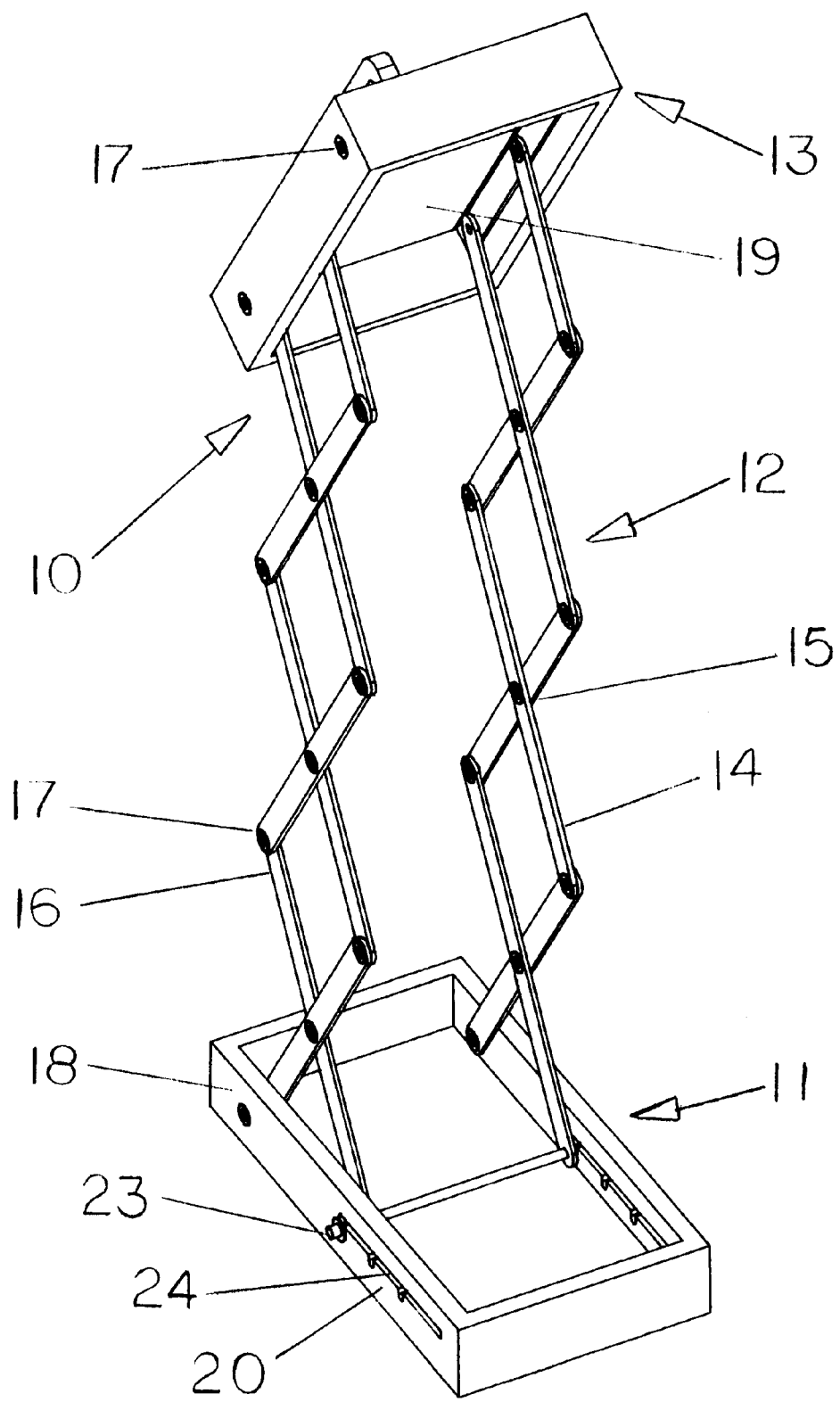
FIG. 1 is a top, front, perspective view of a the aligning apparatus of the invention.
Figure 2:
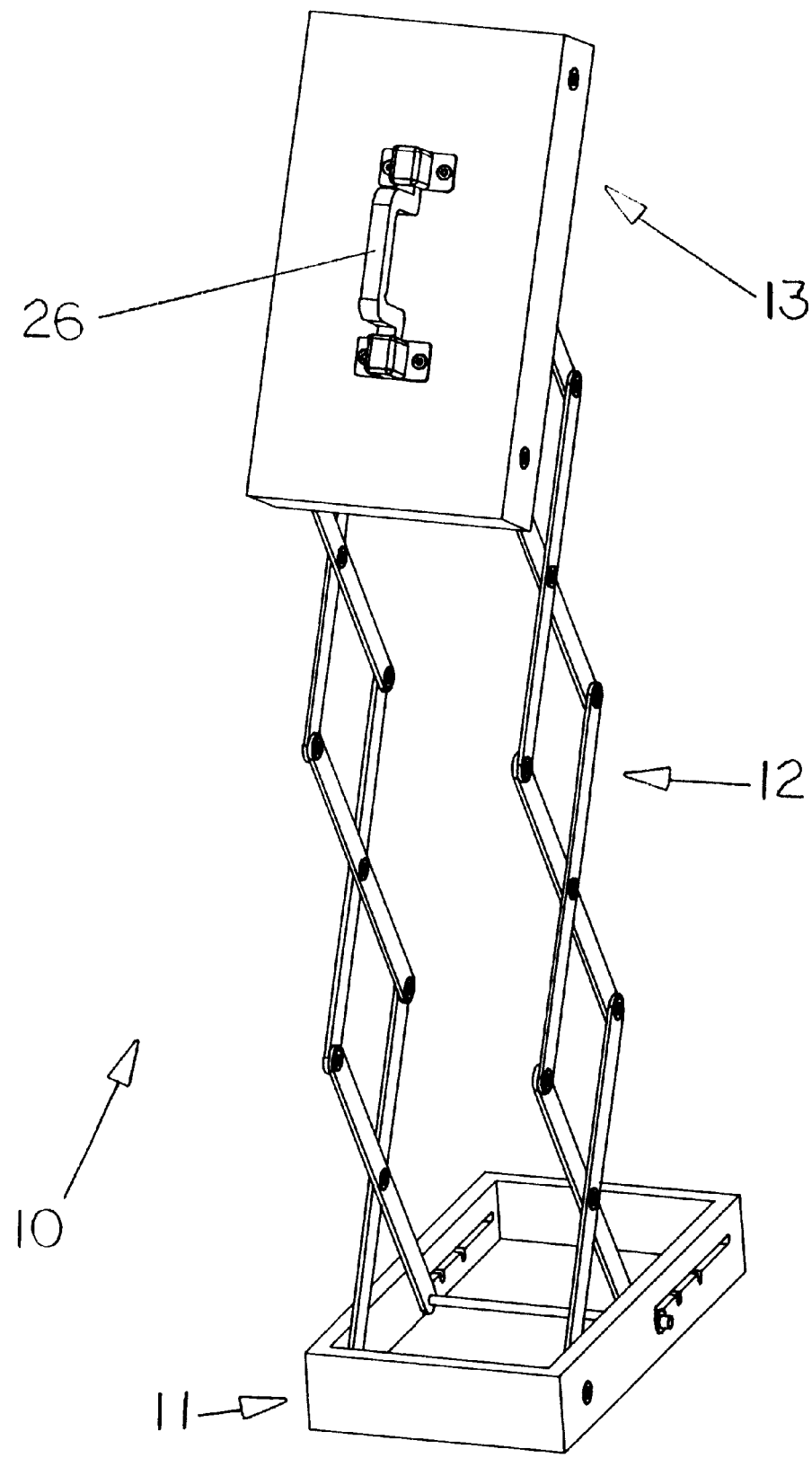
FIG. 2 is a top, rear, perspective view of the aligning apparatus of the invention.
Figure 3:
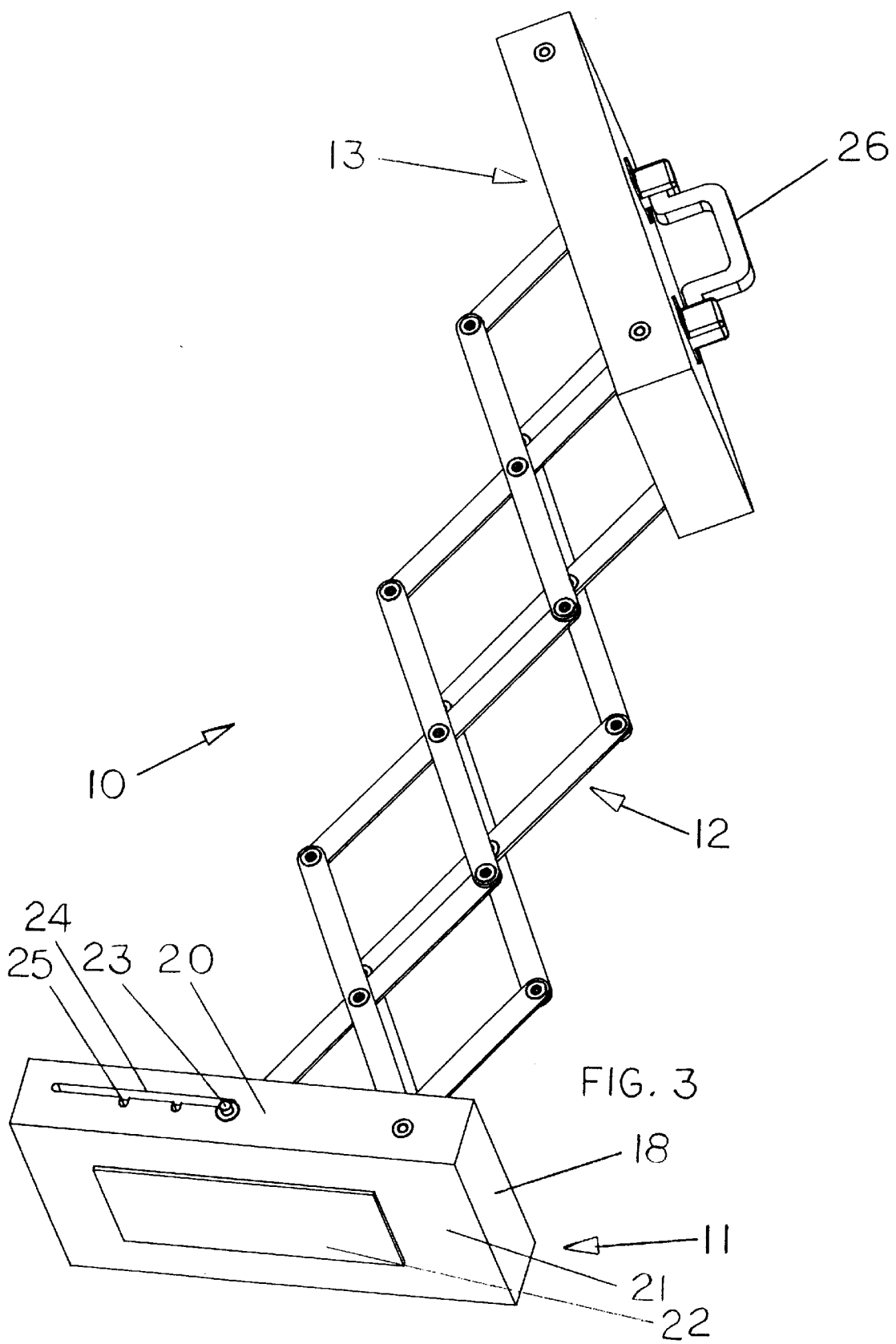
FIG. 3 is a bottom perspective view of of the aligning apparatus of the invention.
Figure 4:
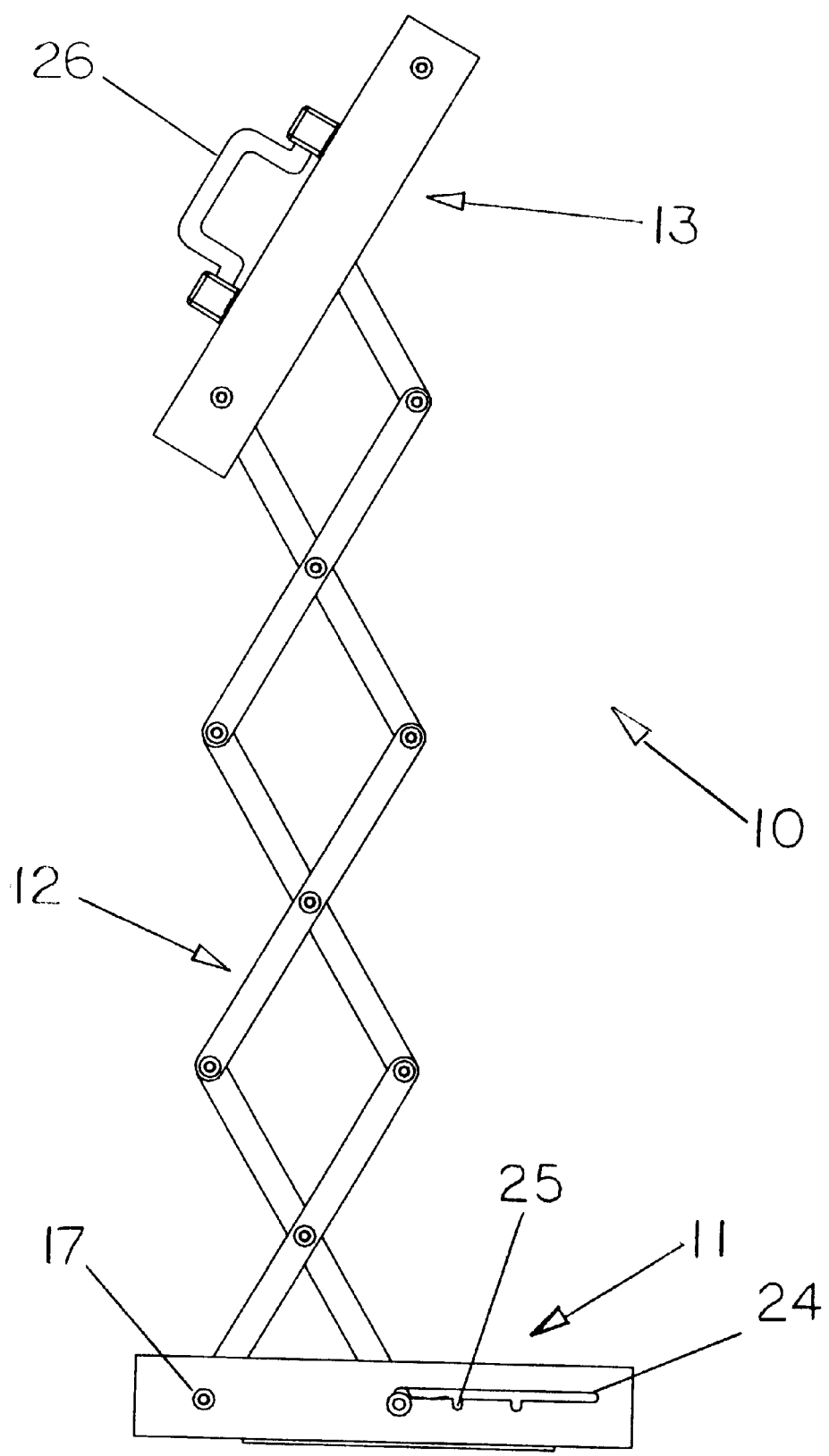
FIG. 4 is a side elevational view of the aligning apparatus of the invention.
Figure 5:
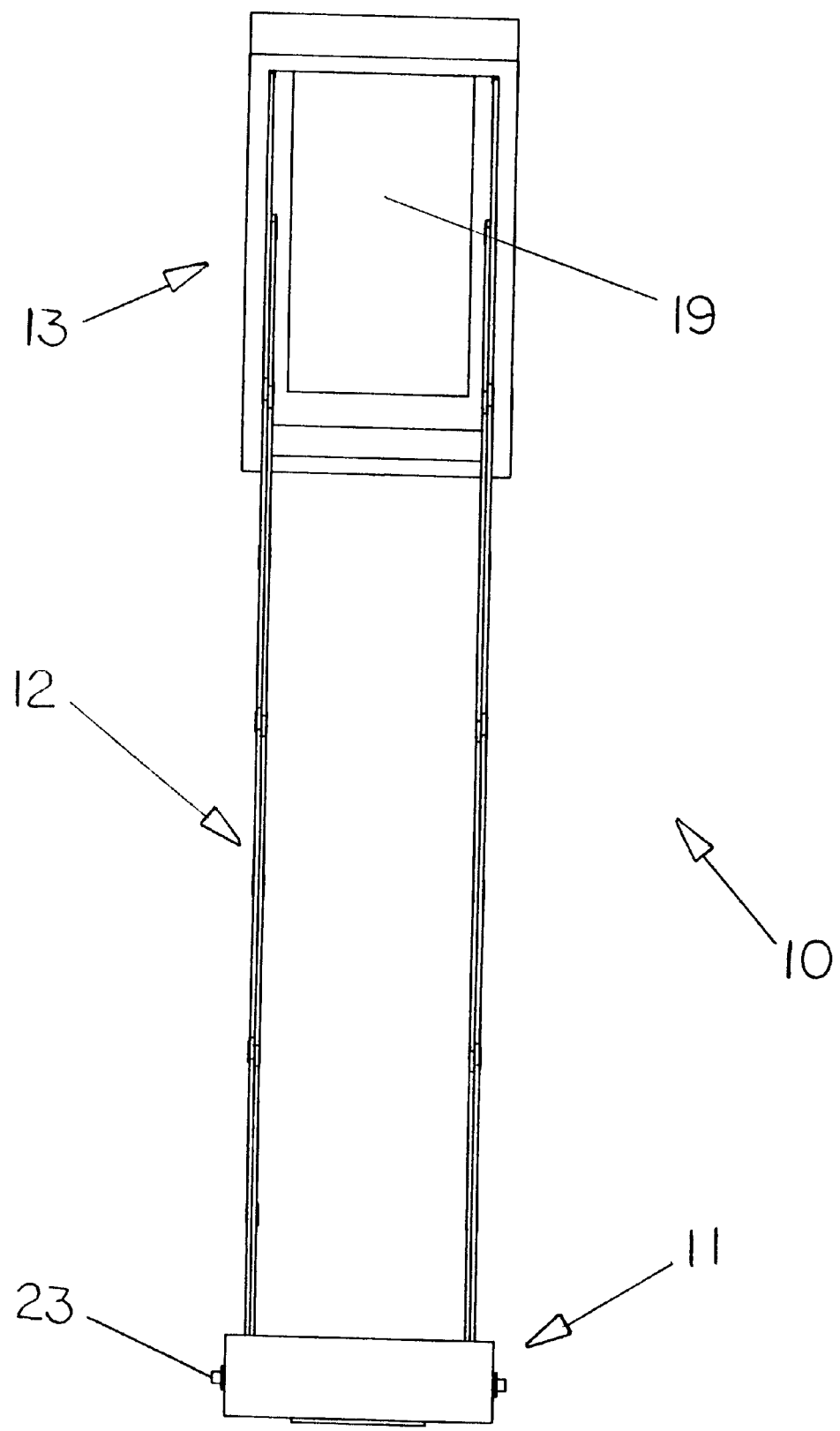
FIG. 5 is an elevational front view of the aligning apparatus of the invention.
Figure 6:
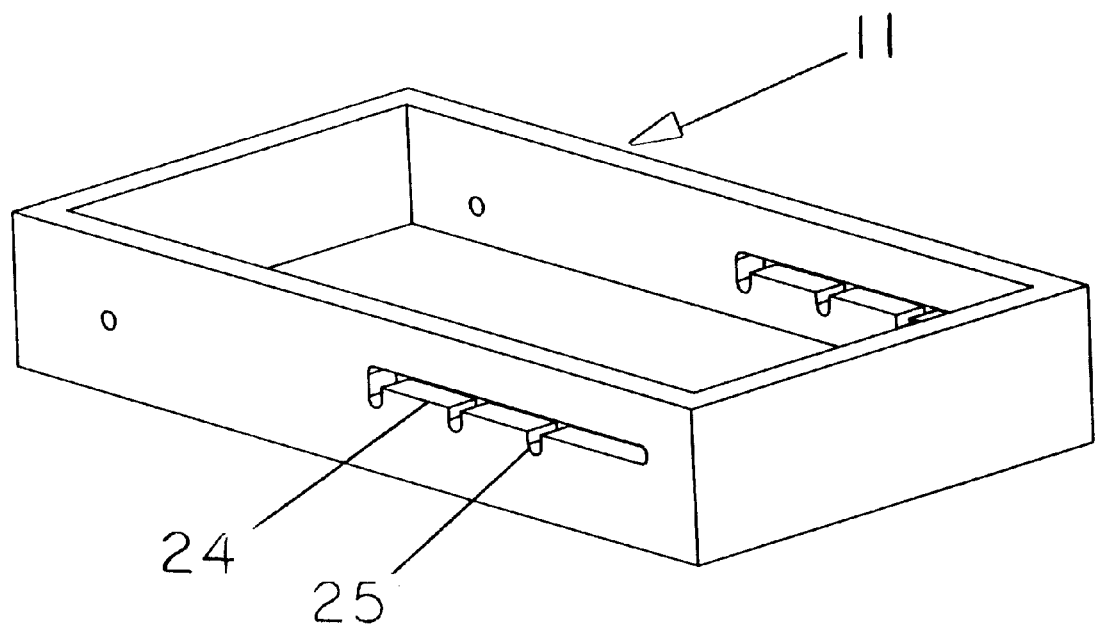
FIG. 6 is a top perspective view of the base of the aligning apparatus of the invention.
Figure 7:
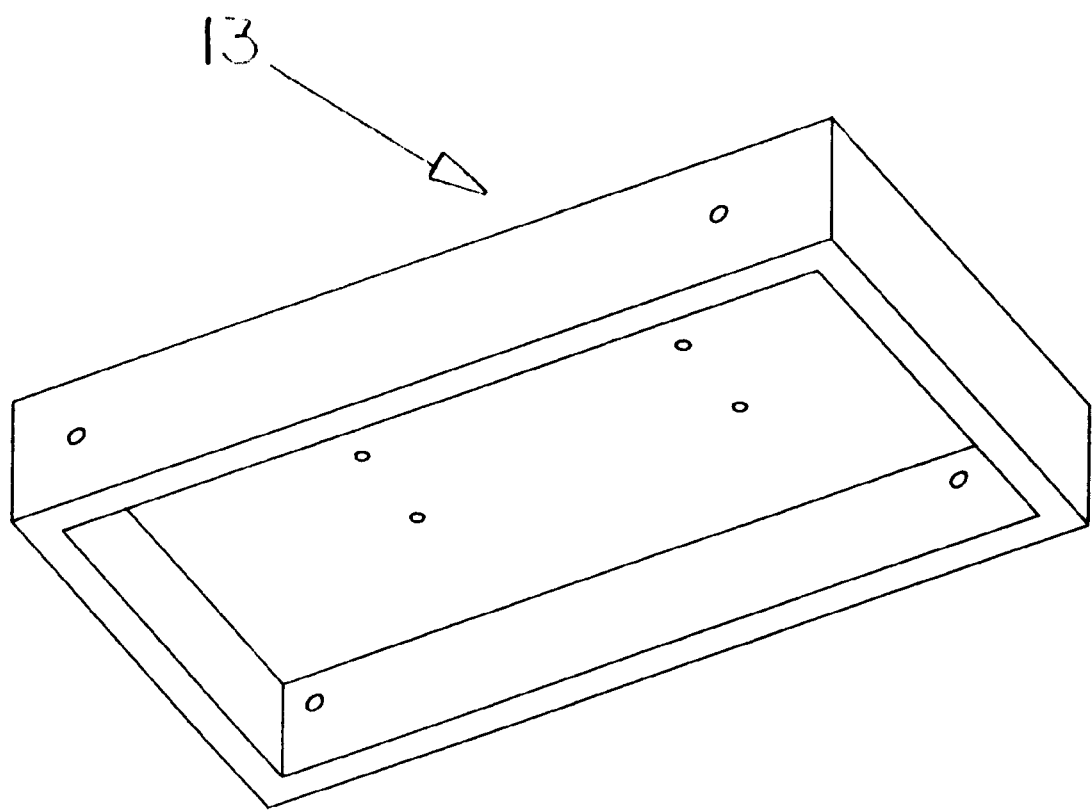
FIG. 7 is a bottom perspective view of the aligning apparatus of the invention.

Referring now to the drawings, wherein like reference characteristics designate like or corresponding parts throughout the several views, there is shown in FIG. 1 (which illustrates a preferred embodiment) the alignment apparatus designated generally by the numeral 10. The aligning apparatus 10 consists of the base box 11, the scissors lift 12, and top box 13. The scissors lift 12 consists of a series of levers 14 pivotally connected to each other at mid portions 15 and end portions 16. The Scissors lift 12 is assembled by pivotally fastening levers 14 to each other with rivets 17 or other state of the art fastening means which will hold the levers 14 sufficiently close to prevent sideways motion and still provide ease of rotation as the scissors jack 12 is raised and lowered.

End portions 16 are pivotally fastened to base box 11 at a first end 18 with rivets 17 to provide for rotation during raising or lowering of the scissors jack 12. Opposing end portions 16 are pivotally fastened at opposite ends of rod 23 which also keeps the slideable lower portions 16 separated in parallel relationship. The rod 23 slides within, and is guided by slots 24 during folding and unfolding. When the scissors lift 12 is raised to the desired level, the rod 23 is engaged in the appropriate notch 25 where it is held in place. At least two sets of notches 25 are provided in the example. however, additional notches 25 may be provided if more positions are desired. A handle 26 is mounted on the top surface of top box 13 to provide a convenient gripping area to lift the aligning apparatus to its operating position and to carry the apparatus when not in use or not mounted on the trailer tongue 37.

At the top end of the scissors lift 12, the end portions 16 of levers 14 are pivotally fastened to top box 13 with rivets 17 in the same manner as used to fasten the lower end to base box 11. A mirror 19 is fastened on the underside of top box 13. The top box 13 is pivoted to permit setting the mirror 19 at a 45° angle to a horizontal plane to provide a 90° view for the operator of the towing vehicle 38 looking through the rear view mirror. When the reverse image provided by the mirror 19 reaches the rear view mirror of the vehicle, it is again reversed, thereby presenting a true view of the relationship between the hitch ball 36 and hitch cup 35.

Figure 8:
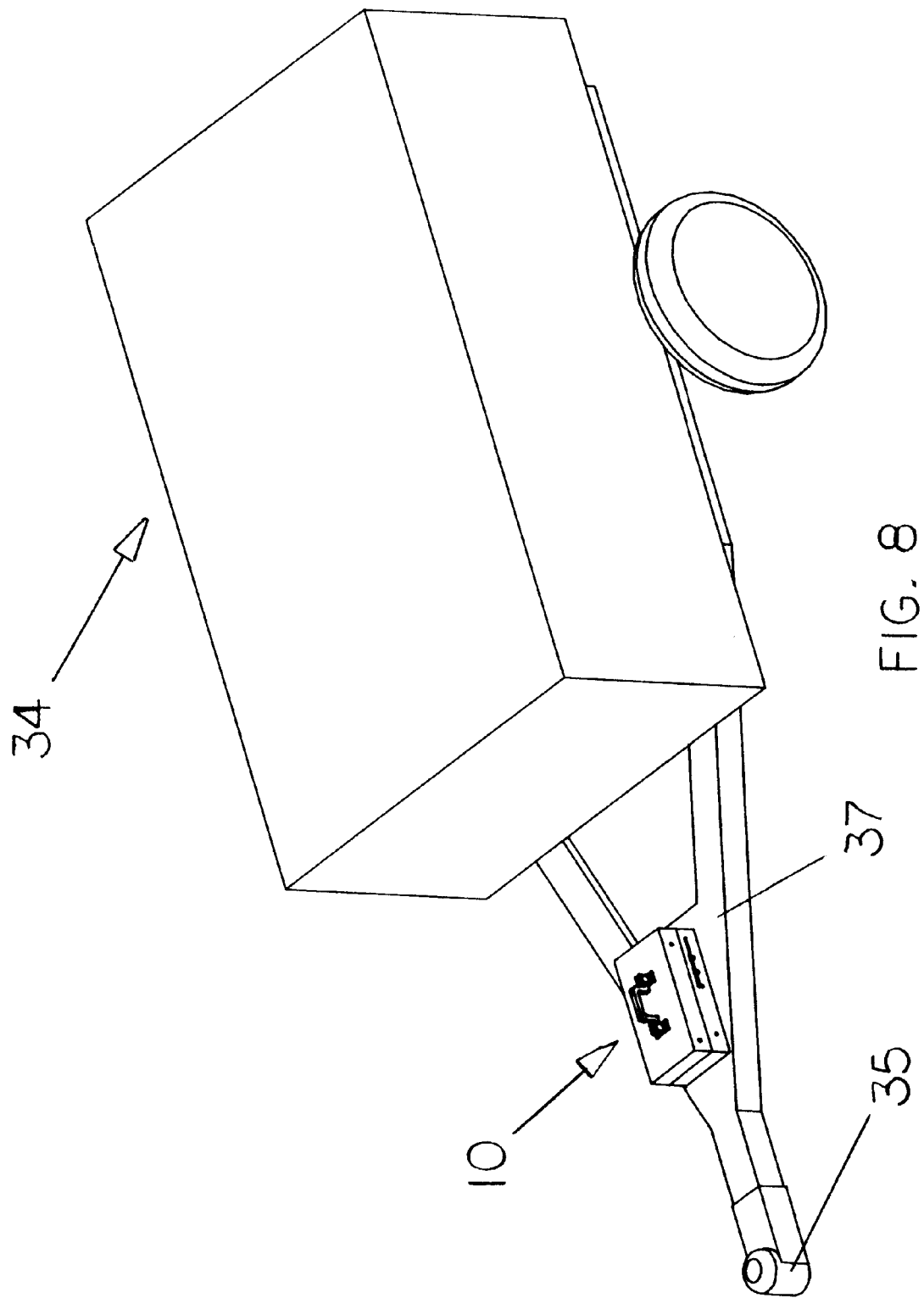
FIG. 8 is a top perspective view of the aligning apparatus of the invention mounted on a trailer.
Figure 9:
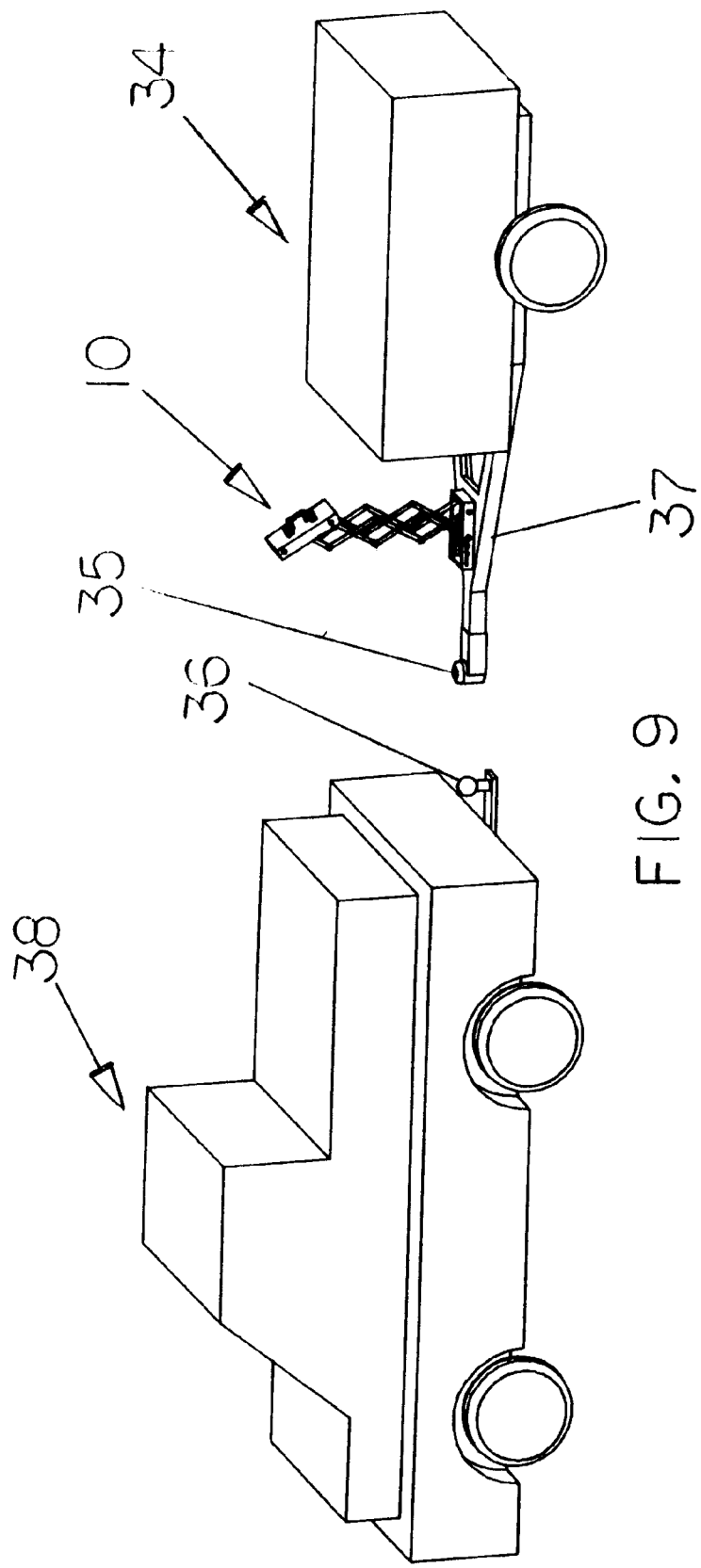
FIG. 9 is a top perspective view of the aligning apparatus of the invention.
Figure 10:
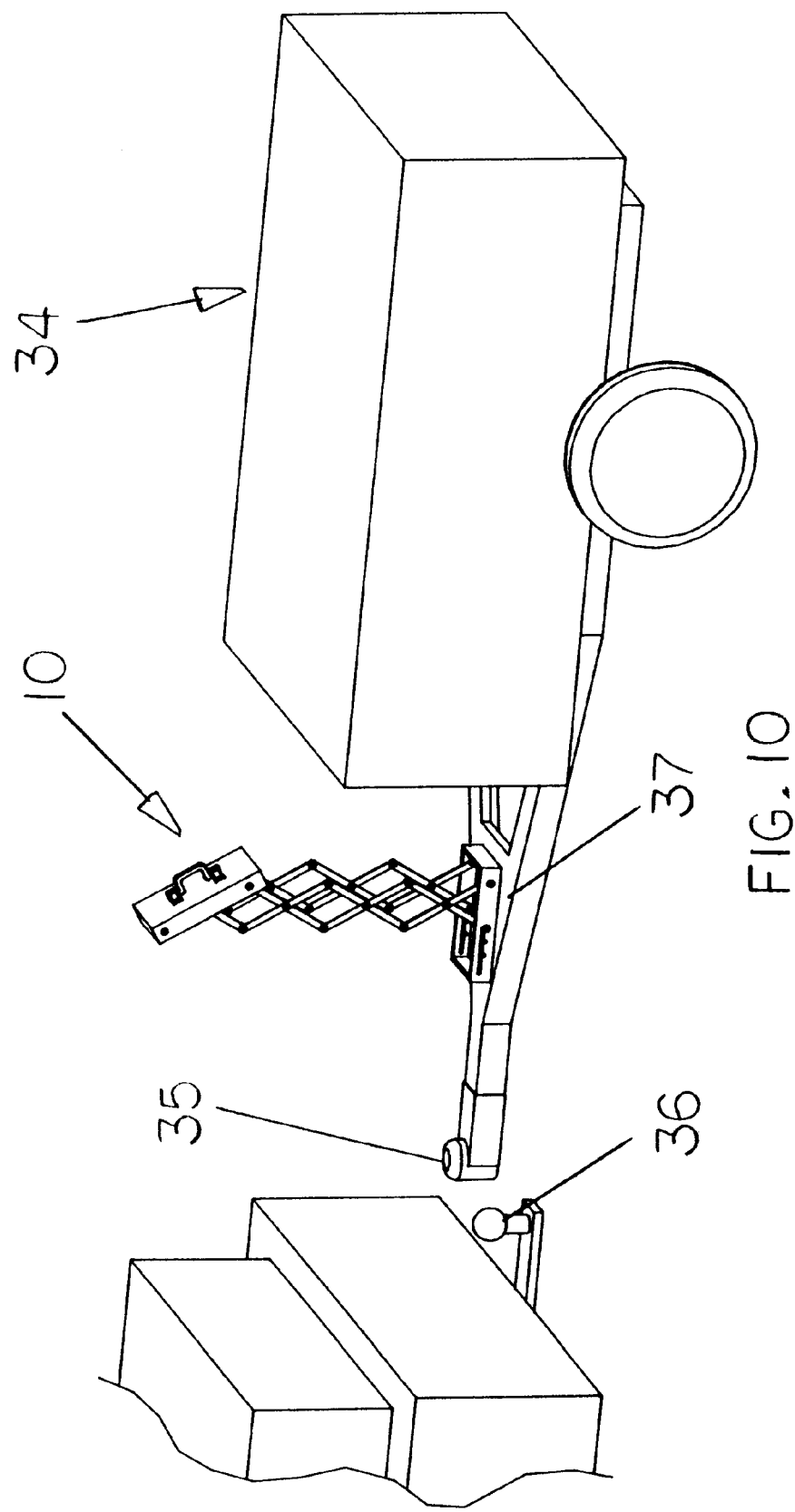
FIG. 10 is a top rear perspective view of the trailer prior to being hitched to the towing vehicle.
Figure 11:
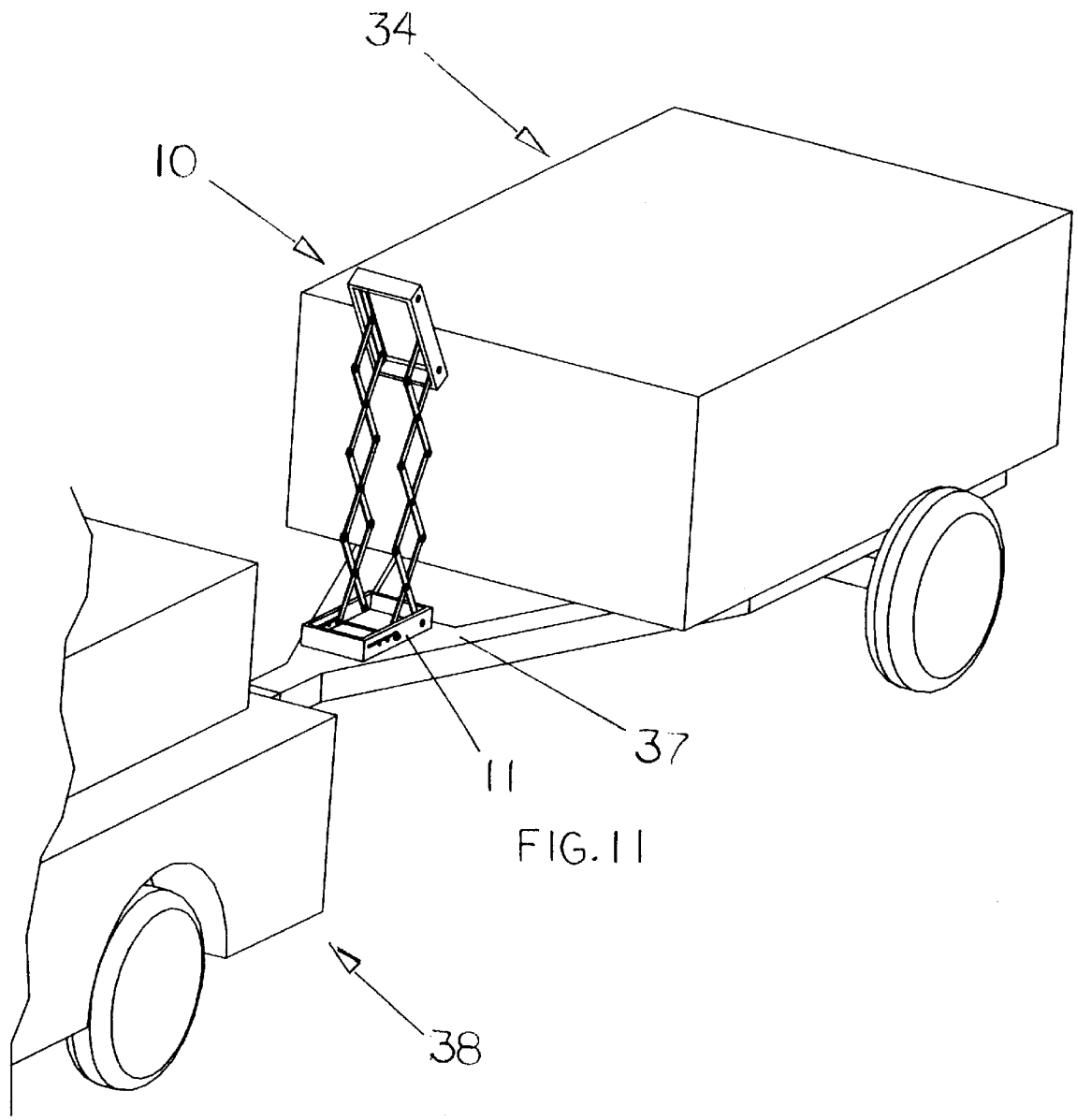
FIG. 11 is a top front perspective view of the trailer and towing vehicle prior to hitching.
Figure 12:
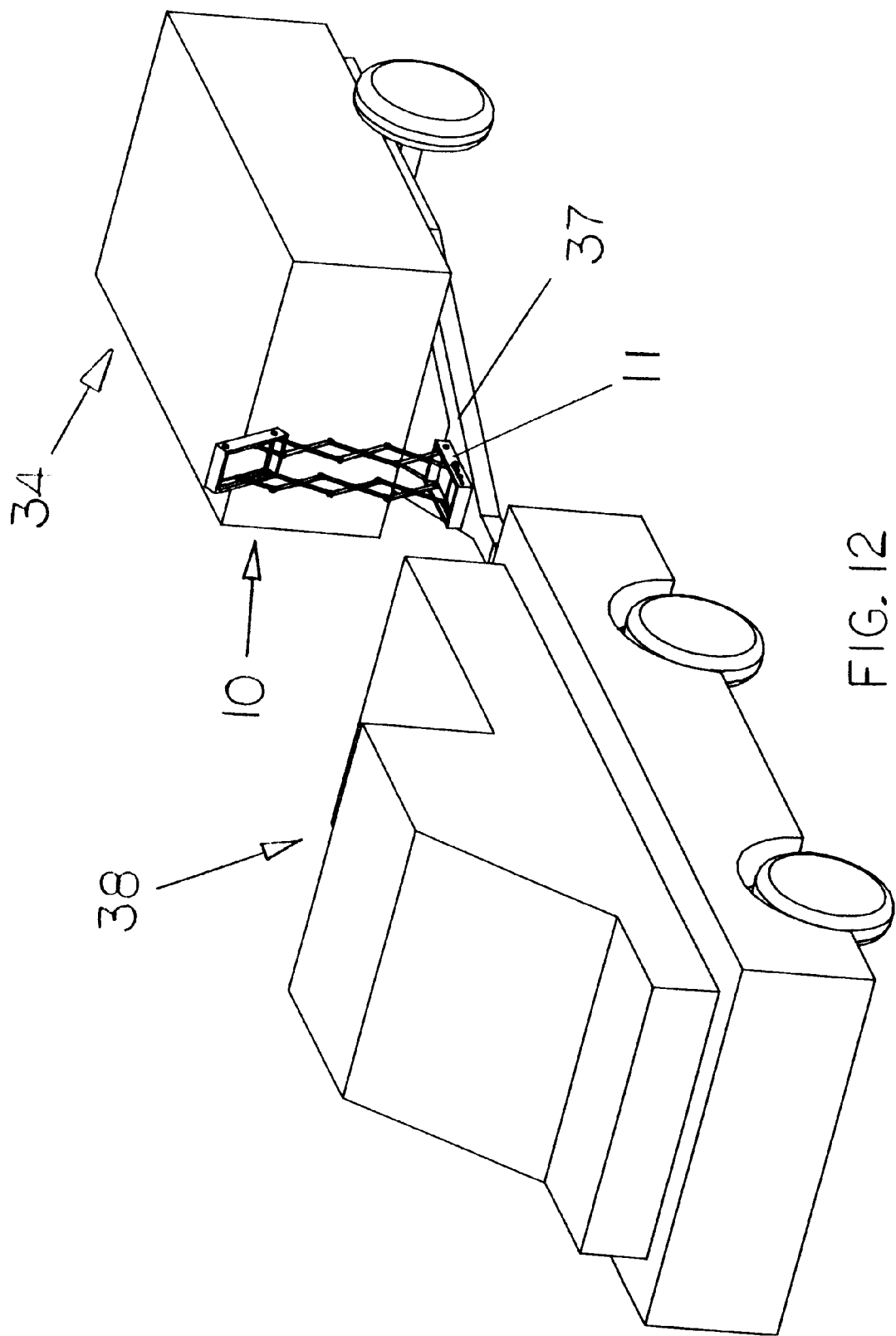
FIG. 12 is a top front perspective view of the trailer and towing vehicle in a hitched condition.

FIGS. 9 through 12 show the aligning apparatus 10 as it is mounted on a trailer tongue 37. FIG. 11 depicts the view of the aligning apparatus 10 as it is seen through the rear view mirror of towing vehicle 18. A section of VELCRO (not shown) is fastened to the trailer tongue 37 and a mating strip of VELCRO 22 is fastened to the underside of base box 11. The VELCRO 22 located on base box 11 is then mated with the VELCRO of trailer tongue 37 where it remains while necessary for connecting the trailer 34 with the vehicle 38. After the connection is made, the aligning apparatus 10 may then be collapsed and closed as shown in FIG. 8 and may remain on the trailer tongue 37 or readily removed by lifting up on the handle 26 and releasing the grip of the mated VELCRO fastener 22.

While the invention has been explained with respect to a preferred embodiment thereof, it is contemplated that various changes may be made in the invention without departing from the spirit and scope thereof.

What is claimed is:

1. An apparatus for aligning the hitch of a towing vehicle with the mating hitch of a towed vehicle, comprising:

a base box adapted to be detachably fastened to a trailer tongue of the towed vehicle, said base box having a front, back and two sides, said sides each having a slot with a plurality of notches formed therein, a scissors lift consisting of a series of levers pivotally connected to each other at mid portions and at end portions, a first pair of said levers being pivotally connected to said sides within said base box, a rod slidably moveable in said slots in said base box and a second pair of said levers being pivotally mounted on said rod and held in spaced relationship to each other by said rod, and a top box having a top, an underside, and having two sides pivotally fastened to a plurality of said levers of said scissors lift, said top box having a mirror fastened to said underside, said top box being positionable to a 45° angle for reflecting an image of the mating hitches in a rear view mirror of the towing vehicle.

2. The apparatus described in claim 1 wherein a strip of VELCRO is fastened to the underside of said base box for attachment to the towed vehicle.

* * * * *